(12) United States Patent
Cebron et al.

(10) Patent No.: US 9,495,612 B2
(45) Date of Patent: Nov. 15, 2016

(54) ACCELERATED OBJECT RECOGNITION IN AN IMAGE

(71) Applicant: Robert Bosch GmbH, Stuttgart (DE)

(72) Inventors: Nicolas Cebron, Hildesheim (DE); Jie Yu, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/553,412

(22) Filed: Nov. 25, 2014

(65) Prior Publication Data

US 2015/0146927 A1 May 28, 2015

(30) Foreign Application Priority Data

Nov. 28, 2013 (DE) .................. 10 2013 224 382

(51) Int. Cl.
| | | |
|---|---|---|
| *G06K 9/00* | (2006.01) | |
| *G06K 9/62* | (2006.01) | |
| *G06K 9/68* | (2006.01) | |
| *G06K 9/46* | (2006.01) | |

(52) U.S. Cl.
CPC ........... *G06K 9/6202* (2013.01); *G06K 9/6857* (2013.01); *G06K 2009/4666* (2013.01)

(58) Field of Classification Search
USPC .................................................. 382/224–228
See application file for complete search history.

(56) References Cited

U.S. PATENT DOCUMENTS

| | | | | |
|---|---|---|---|---|
| 7,505,609 B1 * | 3/2009 | Hartman | ............... | G06K 9/3208 382/103 |
| 2003/0108244 A1 * | 6/2003 | Li | ...................... | G06K 9/00228 382/227 |
| 2003/0110147 A1 * | 6/2003 | Li | ...................... | G06K 9/00228 706/1 |
| 2004/0013305 A1 * | 1/2004 | Brandt | .............. | G06F 17/30902 382/224 |
| 2004/0165784 A1 * | 8/2004 | Xie | ...................... | G06K 9/3233 382/254 |
| 2007/0098218 A1 * | 5/2007 | Zhang | ................ | G06K 9/00228 382/103 |
| 2010/0172543 A1 * | 7/2010 | Winkler | ................. | G08G 1/017 382/104 |
| 2012/0014590 A1 * | 1/2012 | Martinez-Bauza | ... | G06T 7/0022 382/154 |
| 2012/0045095 A1 * | 2/2012 | Tate | ........................ | G06T 5/003 382/103 |
| 2013/0188045 A1 * | 7/2013 | Kalevo | ................. | G06T 7/2006 348/143 |

OTHER PUBLICATIONS

Freund et al., "A Decision-Theoretic Generalization of On-Line Learning and an Application to Boosting," Journal of Computer and System Sciences, vol. 55, 1997, pp. 119-139.

(Continued)

*Primary Examiner* — Alex Liew
(74) *Attorney, Agent, or Firm* — Michael Best & Friedrich LLP

(57) ABSTRACT

A method for recognizing an object (120) in an image (100), in which the recognition of the object (120) comprises a first scaling stage of a scaling region of the image (100), and at least a further scaling stage of the scaling region of the image (100); and in which the image (100) is subdivided into at least one image segment (110); a first decision being taken for the at least one image segment (110) on the first scaling stage of the scaling region as to whether the at least one image segment (110) is considered on the at least one further scaling stage of the scaling region for the recognition of the object (120).

7 Claims, 1 Drawing Sheet

(56) References Cited

OTHER PUBLICATIONS

Viola et al., "Rapid Object Detection using a Boosted Cascade of Simple Features," Proceedings Conference on Computer Vision and Pattern Recognition, vol. 1, Dec. 2001, pp. 1-9.

Torres et al., "The Importance of the Color Information in Face Recognition," International Conference on Image Processing, Kobe, Japan, 1999, pp. 627-631.
Dollar et al., "The Fastest Pedestrian Detector in the West," British Machine Vision Conference (BMVC), Aberystwyth, UK, 2010, pp. 1-11.

* cited by examiner

ACCELERATED OBJECT RECOGNITION IN AN IMAGE

BACKGROUND OF THE INVENTION

The present invention relates to a method for the recognition, in particular an accelerated recognition, of an object in an image, in particular in the course of video monitoring.

Object detectors are used in video analysis in order to afford the user additional functionality. This includes, for example, the recognition of suspicious objects or persons, numbers of persons or automatic monitoring of a specific area in the image.

The task of an object detector is to find objects in different sizes and positions in the image. For this purpose, it is routine to use classifiers which receive as input a vector comprising calculated features of an image segment. The output is a binary decision as to whether the considered image segment includes an object. In order to find objects at all positions in the image, the image segment is pushed over the image, and the object detector is applied at each site. In order, in addition, to find objects of different sizes, the object detector is applied to scaled versions of the image. The product of the number of scaling and the positions in the image yields the number of required classification runs, and influences the run time and the accuracy of the object detection.

A boosting classifier is one which is frequently used in image and video classification. As regards details in more depth, reference is made to relevant publications such as Y. Freund, R. Schapire. A Decision-Theoretic Generalization of On-Line Learning and an Application to Boosting. Journal of Computer and System Sciences, Vol. 55, 1997. So called weak classifiers are combined with one another in this case. A typical example of a weak classifier is a so called decision stump, for which the value of a single feature from the image segment is compared with a threshold value. If the value is above the threshold value, a positive output results, otherwise a negative one. The outputs of the weak classifiers are combined with one another in the case of the boosting classifier in order to give rise to a classification decision. However, this procedure requires very many classifications to be carried out, and this can be problematic for real time applications.

It is also possible to use a so called classification cascade such as is described in P. Viola, M. Jones. Rapid Object Detection using a Boosted Cascade of Simple Features. Proceedings Conference on Computer Vision and Pattern Recognition, Vol. 1, December 2001. Here, the image segment is classified with the aid of a sequence of boosting classifiers of growing complexity. The classification is terminated as soon as one of the classifiers outputs a negative decision. It is therefore usual for only a subset of the classifiers to be used, and this leads to savings in time. However, it is also necessary here to carry out very many classifications, and this can be problematic for real time applications.

There is, in addition, the possibility of restricting the search space in the image, for example by background recognition (for example, search for skin colorations in the color image of face recognition, see L. Torres, J. Y. Reutter, L. Lorente. The Importance of the Color Information in Face Recognition. International Conference on Image Processing, Kobe, Japan, 1999). However, such methods are detached from the actual method of object detection and produce additional run time.

It is therefore desirable to specify a possibility of accelerating object detection in an image, in particular regarding real time applications.

SUMMARY OF THE INVENTION

In the case of a method according to the invention for recognizing an object in an image, in particular for video monitoring, an image in which the object is intended to be recognized is subdivided into image segments, and the image segments are investigated for different scaling stages of the image. Here, the term scaling relates to the change in size of a digital image in the case of which a new image with a higher or lower number of pixels is generated. It is advantageous here when the image segments are initially investigated only for one scaling stage and, in so doing, it is estimated whether an object to be recognized will be included for further scaling stages in the image segment. It is expedient to start the scaling at a lower scaling stage, the further scaling stages lying thereabove, that is to say ever larger image segments are analyzed. In this way, there is no longer any need to investigate for further scaling stages those image segments for which an object to be recognized will not be present in any case. This saves computing time and therefore accelerates object recognition. It has been shown in the work of P. Dollar, S. Belongie, P. Perona. The Fastest Pedestrian Detector In the West. British Machine Vision Conference (BMVC), Aberystwyth, UK, 2010 that for data sets from the domain of person detection it is possible by means of regression to interpolate the values of different features within a so called octave (an octave respectively comprises the scale region from the upper scaling stage of an image as far as half, for example [1.0; 0.5], [0.5; 0.25] . . . ). This knowledge is used in the method presented here, by assuming that the value of a feature at its specific position in the image varies by at most a specific value in an octave. If this change does not lead to a positive result, the entire octave can be left out.

The estimate is undertaken on the lowest scaling stage of each octave. The normal classification process is firstly carried out at each position. If a cascade is being used, there is a subsequent evaluation as to whether the stage reached is below a parameter defined by the user. If this is the case, the boosting classifier of the stage reached is considered. If the decision of the boosting classifier has been negative, all decision stumps and the associated feature values are considered anew. Each weak classifier is estimated by evaluating whether the decision could possibly change and could thereby change the negative overall decision. If this is not the case, said position is marked as irrelevant in a global processing mask.

For such estimation, it is advantageous to employ simple individual decisions, in particular so called decision stumps of a boosting method. Such methods are known from the prior art.

It is also advantageous when, in the case of the individual decisions, values, for example, feature values, or parameters or features, are compared for an object to be recognized with threshold values with the aid of which it is decided whether an image segment includes an object to be recognized. If such a value is inside an interval around a threshold value, it is possible for the individual decision to change for other scaling stages of the same image segment. This can be included in the estimation and thereby increases the effectiveness of the object detection.

It is also preferred to use a method according to the invention for an existing object detection when the latter is based on a boosting and/or cascade method such as is known from the prior art. Such a method can thereby be accelerated.

In this case, it is advantageous for the estimation to fix a threshold value for the number of required decisions in the cascade method. If the required number of the decisions is therebelow, the abovenamed method can be used to estimate whether an image segment is considered anew for further scaling stages with the aid of the cascade method. It is possible to accelerate a cascade method therefore.

An arithmetic logic unit according to the invention, for example a computer of a video monitoring installation, is set up, in particular by programming, so that a method according to the invention is carried out.

The implementation of the method in the form of software is also advantageous, since this gives rise to particularly low costs, in particular when an executing controller is still being used for other tasks and is therefore present in any case. Suitable data carriers for providing the computer program are, in particular, floppy disks, hard disks, flash memories, EEPROMs, CD-ROMs, DVDs as well as others. It is also possible to download a program via computer networks (Internet, Intranet etc.).

Further advantages and refinements of the invention result from the description and the attached drawing.

It goes without saying that the features named above and those following, which have yet to be explained, can be used not only in the respectively specified combination, but also in all the combinations or on their own without departing from the scope of the present invention.

BRIEF DESCRIPTION OF THE DRAWINGS

The invention is represented schematically in the drawing with the aid of exemplary embodiments, and is described in detail below with reference to the drawing.

DETAILED DESCRIPTION

Figure 1:
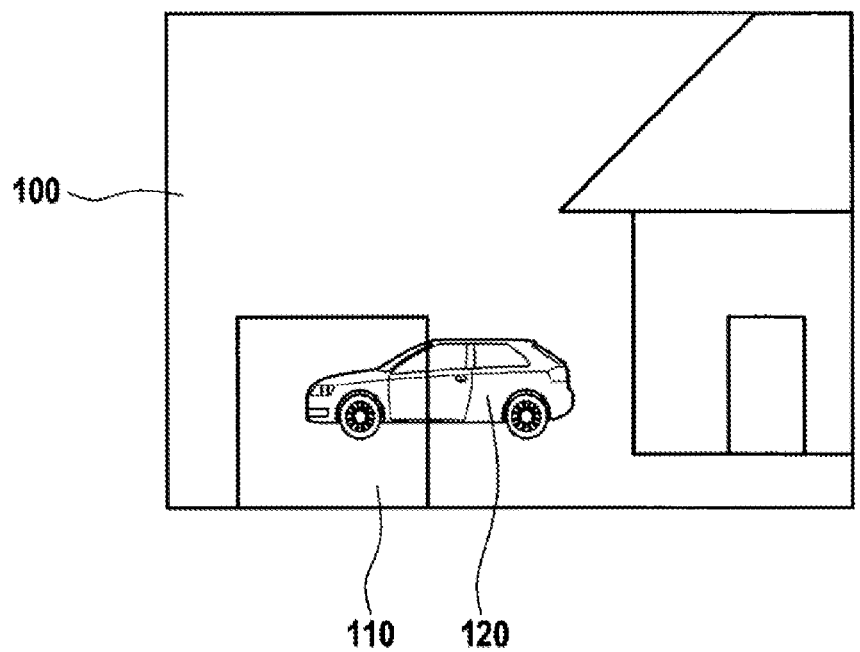
FIG. 1 is a schematic of an image having an object and an image segment.

FIG. 1 is a schematic of an image 100 which can, for example, originate from video monitoring. It illustrates an object 120, for example as a vehicle. Also illustrated by way of example is an image segment 110 of the image 100.

In order to recognize the object 120 in the image 100, the latter is subdivided into image segments 110, preferably such that the image segments 110 cover the entire image 100, or else only a preferred area. It is likewise advantageous when the image segments 110 overlap one another. Again, the size of the image segments 110 can be selected depending on requirement.

There are a plurality of scaling stages for the image 100, that is to say the object 120 thereby differs in size with reference to the image segment 110. For a specific scaling region, for example, selected so that a ratio of the scaling stages at the start and at the end of the scaling region is 2:1 (octave), a scaling stage is selected at the start or at the end of the scaling region, for example. A scaling region can include 12 scaling stages, for example.

In a preferred refinement, a decision is made in said scaling stage for each image segment 110 as to whether the object 120 is included, or whether the object 120 will be included for further scaling stages of the scaling region. A recognition of the object 120 is carried out for the further scaling stages of the scaling region for the image segments 110 in which the object 120 is included or will be included for further scaling stages of the scaling region.

The image segments 110 in which the object 120 is not included or will not be included for further scaling stages of the scaling region are therefore no longer taken into account for the further recognition of the object 120. This can, for example, be half the image segments. The recognition of the object 120 is thereby clearly accelerated.

Figure 2:
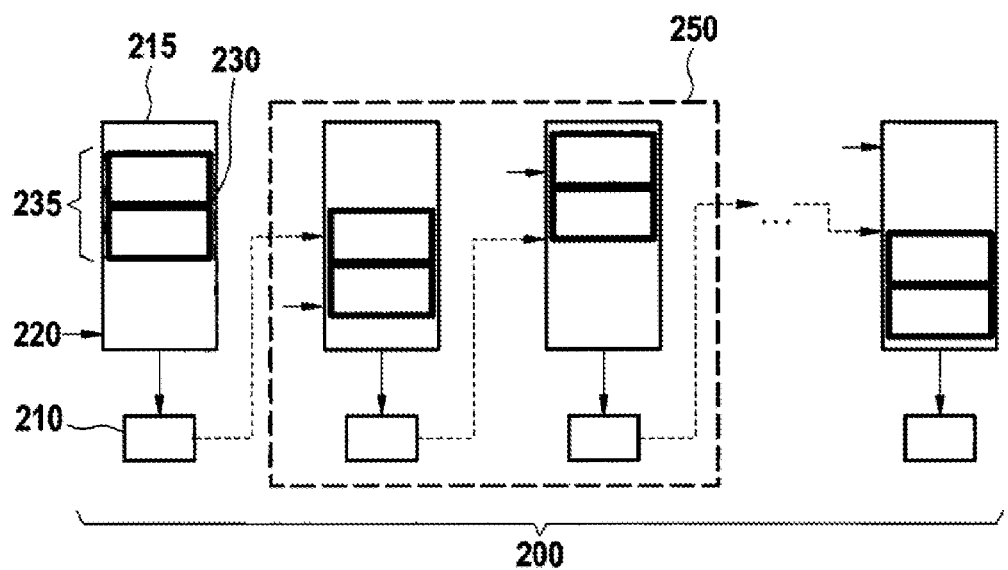
FIG. 2 is a schematic of a plurality of individual decisions which together result in a decision.

Illustrated schematically in FIG. 2 are a plurality of first individual decisions 210 which together yield the first decision 200. The decision 200 states whether the object 120 is included in the investigated image segment 110, or whether the object 120 will be included for further scaling stages of the scaling region. Also illustrated are parameters 215 which can, for example, be features of the object 120, a first threshold value 230, an interval 235 about the first threshold value 230, which comprises, for example, the area 20% in front to 20% behind the first threshold value 230, and a value 220 of the parameter 215.

The first decision 200 results from the first individual decisions 210, which can be positive or negative, by virtue of the fact that summations are performed over the first individual decisions 210, the first individual decisions 210 additionally still having a weighting factor applied. The weighting factor specifies which weight the first individual decisions 210 have relative to one another. That is to say, it is possible, for example, for a first individual decision to have more weight concerning the recognition of the object 120 than does another.

A first individual decision 210 is the result of an investigation as to how a value 220 for the associated parameter 215 is situated in the relevant image segment 110 with reference to a first threshold value 230. If the value 220 lies above the threshold value 230, said first individual decision 210 is positive for the relevant image segment 110 in the relevant scaling stage, while if the value 220 lies below the threshold value 230, the first individual decision 210 is negative.

However, if it is assumed that the value 220 for the associated parameter 215 changes only to a certain extent, for example by at most 20%, over the scaling stages inside the scaling region, an individual decision 210 can change for a specific image segment 110 over the scaling stages of the scaling region if the value 220 for a scaling stage inside the interval 235 about the first threshold value 230 lies, for example, 20% in front of to 20% behind the first threshold value 230. Such individual decisions are included by way of example in the area 250 in FIG. 2.

In the case of the first decision 200, the first individual decisions 210, which can change over the scaling stages of the scaling region, are therefore taken into account in such a way that they are assumed to be positive. It is only first individual decisions 210 for which the value 220 lies below the first threshold value 230 and, at the same time, outside the interval 235, that are taken into account as being negative.

In a further preferred refinement, before the first decision 200 there is a second decision for the image segment 110 in the first scaling stage of the scaling region as to whether the image segment 110 is considered for the first decision 200. If the second decision is positive, the image segment is considered for the further scaling stages, while the first decision is no longer necessary here. If the second decision is negative, the first decision 200 is taken for the image segment 110, as described above.

The second decision consists of second individual decisions concerning second parameters, for example features, in such a way that the second individual decisions are taken in a sequence ordered by rising complexity, the second individual decisions being built up on one another, for example in a so called cascade method. If a second individual decision is positive, that is to say if the corresponding second parameter indicates the object 120 to be recognized, a next second individual decision is taken. However, if a second individual decision is negative, a sequence of the second individual decisions is terminated.

If, by way of example, the number of positive second individual decisions now lies above a second threshold value, the second decision is positive. However, if the number of negative second individual decisions lies below a second threshold value, the second decision is negative.

It is possible in this way for a method according to the invention also to be used, for example, for object detection based on a cascade method.

A particular example of a method according to the invention will now be explained with reference to FIGS. 1 and 2. The image 100 is firstly recorded in a size or resolution defined by the system, for example with 640×480 pixels. An image segment 110 of fixed size (for example 40×30 pixels) is defined. The analysis begins on a first scaling stage of a scaling region of the image 100 which is preferably an end of an octave. In this case, the image is scaled to 320×240 pixels, in particular by using known resampling methods such as, for example, bicubic or bilinear interpolation.

Subsequently, the image segment 110 is pushed from left to right and top to bottom with a predefined step width (for example, 2 pixels) over the image 100 on the first scaling stage of the scaling region. This yields 140×105 steps or positions.

In each step, a plurality of features 215 are calculated for the image segment 110 at the respective position. This typically concerns sums of grayscale pixels in a specific area in the image segment 110, but other types of features (color, gradients) are also possible. The decisions described with the aid of FIG. 2 are then taken on the basis of the features.

This is repeated for the image on, preferably, a plurality of different scaling stages of the scaling region. The last scaling stage here is the original size of 640×480 pixels. This yields 300×225 steps.

After an evaluation of the classification decision on the first scaling stage, the image segment 110 on the next scaling stage inside the scaling region (here, octave) is left out of consideration only when the first decision was negative. In particular, it is possible from a later scaling stage to jump over all the image segments which because of the changed scaling lie completely inside image segments already negatively decided on an earlier scaling stage.

The method can be repeated for a plurality of, or for all octaves, in the present example 160×120 to 320×240; 80×60 to 160×120; 40×30 to 80×60.

What is claimed is:

1. A method for recognizing an object in an image generated by a video monitoring system, the video monitoring system including a processor, the method comprising:
   providing, in the processor, a first scaling stage of a scaling region of the image, and at least one further scaling stage of the scaling region of the image;
   subdividing the image, with the processor, into at least one image segment;
   making, with the processor, a first decision for the at least one image segment on the first scaling stage of the scaling region as to determine whether or not the at least one image segment should be further scaled by scaling stage of the scaling region; and
   before the first decision, a second decision is taken for the at least one image segment on the first scaling stage of the scaling region as to whether the at least one image segment is considered for the first decision.

2. The method according to claim 1, in which the first decision is based on weighted first individual decisions concerning first parameters which are relevant to the recognition of the object.

3. The method according to claim 2, in which each one of the first individual decisions results from investigating whether a value of a first parameter is below or above a first threshold value and/or inside or outside of an interval around the first threshold value.

4. A method for recognizing an object in an image generated by a video monitoring system, the video monitoring system including a processor, the method comprising:
   providing, in the processor, a first scaling stage of a scaling region of the image, and at least one further scaling stage of the scaling region of the image;
   subdividing the image, with the processor, into at least one image segment;
   making, with the processor, a first decision for the at least one image segment on the first scaling stage of the scaling region as to whether the at least one image segment is considered on the at least one further scaling state of the scaling region; and
   before the first decision, a second decision is taken for the at least one image segment on the first scaling stage of the scaling region as to whether the at least one image segment is considered for the first decision,
   wherein the second decision results from second individual decisions concerning second parameters which are relevant to the recognition of the object, the second individual decisions being taken in a sequence ordered by rising complexity of the second parameters and building up one upon another until a termination condition is reached.

5. The method according to claim 4, in which the at least one image segment is considered for the first decision when the number of the second individual decisions taken up to the termination condition is below a second threshold value.

6. A method for recognizing an object in an image generated by a video monitoring system, the video monitoring system including a processor, the method comprising:
   providing, in the processor, a first scaling stage of a scaling region of the image, and at least one further scaling stage of the scaling region of the image;
   subdividing the image, with the processor, into at least one image segment;
   making, with the processor, a first decision for the at least one image segment on the first scaling stage of the scaling region based on weighted first individual decisions concerning first parameters which are relevant to recognition of the object, and the first decision resulting in whether the at least one image segment is considered on the at least one further scaling stage of the scaling region; and
   before the first decision, making a second decision for the at least one image segment on the first scaling stage of the scaling region as to whether the at least one image segment is considered for the first decision.

7. The method according to claim 6, wherein the second decision results from second individual decisions concerning second parameters which are relevant to the recognition of the object, the second individual decisions being taken in a sequence ordered by rising complexity of the second parameters and building up one upon another until a termination condition is reached.

* * * * *